March 24, 1942.　　　J. M. MELE　　　2,277,445
TANK GAUGE
Filed Dec. 28, 1940　　　2 Sheets-Sheet 1
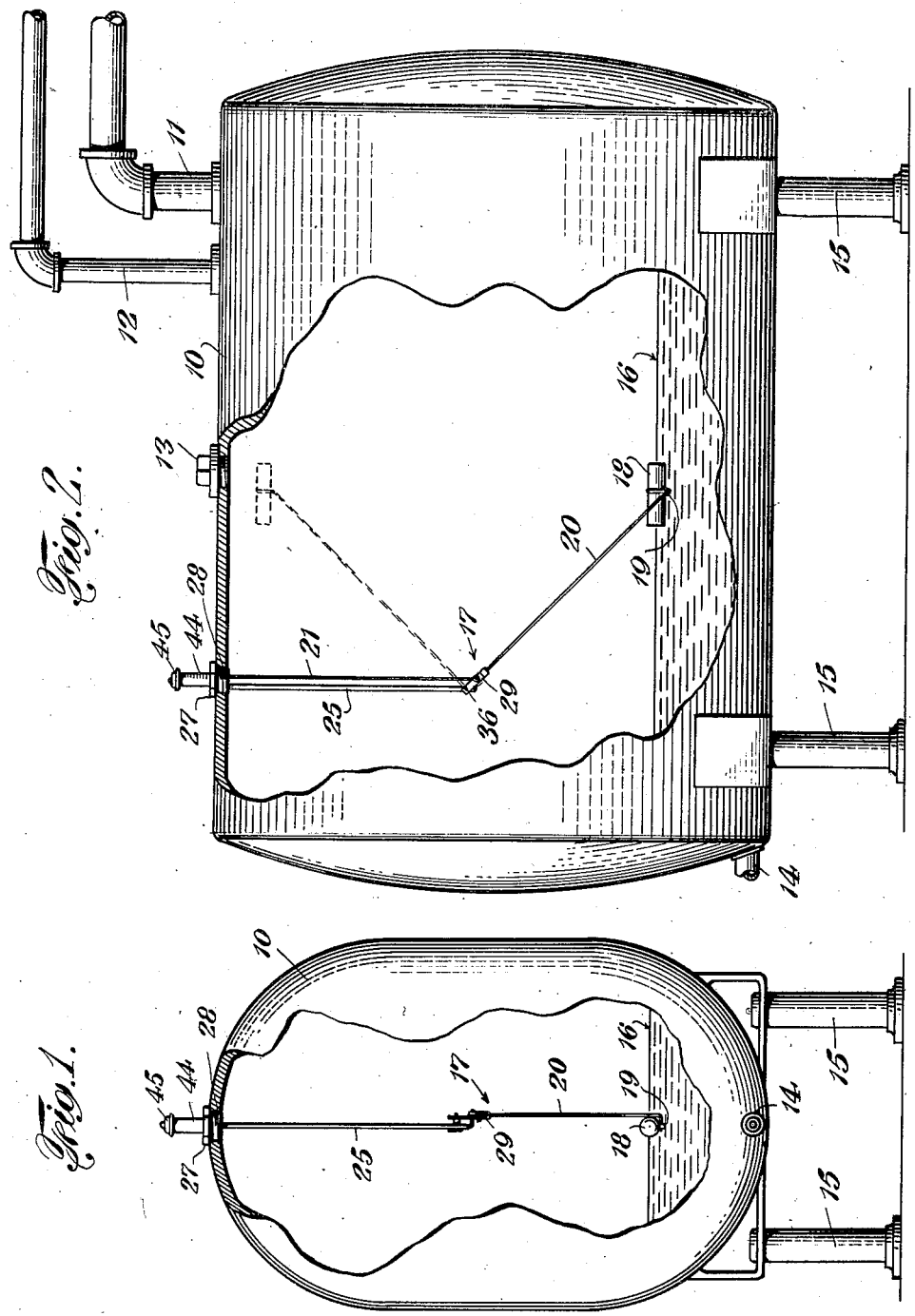
INVENTOR
John M. Mele
BY George E. Hall
ATTORNEY

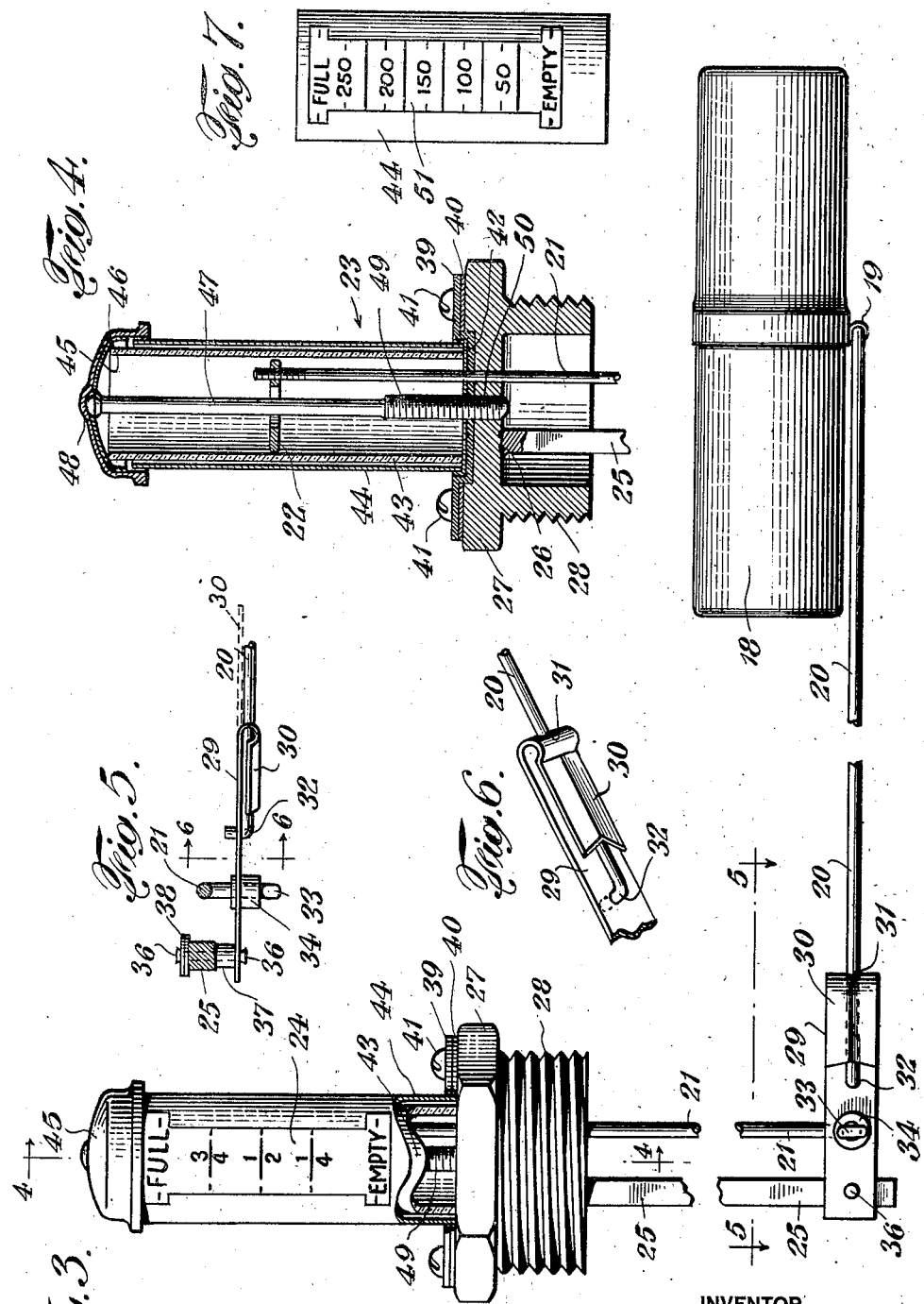

Patented Mar. 24, 1942

2,277,445

UNITED STATES PATENT OFFICE 2,277,445

TANK GAUGE

John M. Mele, East Haven, Conn.

Application December 28, 1940, Serial No. 372,070

8 Claims. (Cl. 73—317)

This invention relates to a new and improved tank gauge whereby to indicate the volume of fluid in a tank or the like.

It is the object of this invention to provide a mechanism of this character wherein the parts thereof are simple to construct, readily assembled and associated with a tank with the minimum labor and skill, it being a further object to provide a mechanism wherein the parts thereof are associated as a unit, and as a unit assembled with the tank, with the indicating element adapted for movement into various positions, whereby the graduations thereon may be exposed to view at different places. Other features and objects of the invention will be apparent from the hereinafter description and the accompanying drawings which illustrate a preferred form of the invention.

In the drawings wherein like numerals of reference indicate like parts in the several figures:

Figure 1 is a fragmentary view of a tank, with this improved invention associated therewith;

Figure 2 is another fragmentary view thereof and particularly illustrating the interior of the tank and the mechanism therein;

Figure 3 is an enlarged fragmentary view of the mechanism of this invention disassociated from the tank;

Figure 4 is a transverse sectional view of the cylinder portion of the invention;

Figure 5 is a view of a portion of the lever mechanism, the parts in section being taken generally upon line 5—5 of Figure 3;

Figure 6 is a fragmentary enlarged detail view of a portion of the float rod holder; and Figure 7 is a detail view of the graduated indicating cylinder.

This invention is adapted for use with oil tanks or the like for supplying fuel to a furnace, although not limited thereto.

It is desirable that the parts indicating the volume of liquid in the tank should be capable of adjustment, so as to expose the graduations thereon to view from the most convenient place or places. This desirable object is present in this invention.

In the drawings, the numeral 10 indicates a tank, 11 an intake pipe, 12 a vent pipe, 14 an outlet pipe, and 13 a vent plug, all associated therewith. The tank, as shown, is supported upon legs or supports 15.

The mechanism just described is of the conventional type and constitutes no portion of the invention. The gauge mechanism as a whole is designated 17, and except for the exterior structure 23, is contained within the tank.

Threaded in one wall of the tank is a bushing 28, having a head 27 of hexagonal or other polygonal form for a well known and conventional purpose and a threaded aperture 50 therethrough. Fixed in the bushing at 26 is a bar 25, on the lower end of which is a float rod holder 29 pivotally connected by the pin 36, upon which is the spacer collar 37 and washer 38. This float rod holder is preferably constructed of sheet metal, having two apertures 31 and 32, through both of which projects a float rod 20, having a turned end, substantially as shown in Figure 5. The float rod 20 is assembled with the holder 29 by first projecting the turned end of the float rod 20 through the opening 31 and then into the opening 32. Thereafter, the end 30 of the float rod holder 29 is bent backward upon itself and is then substantially parallel with the other portion thereof, substantially as shown in Figures 3 and 5. The outer edges of this portion 30 are pressed inwardly, substantially covering and enclosing the float rod 20, holding the latter against lateral movement and against disengagement from the float rod holder. A float 18 is connected with the outer end of the float rod 20 by a swivel joint 19 and rides upon the top of the liquid 16 within the tank.

Secured to the bushing 28 by screws 41 or the like, is a dished disk 40, partly surrounded by a washer 39, and within which is a washer 42. Resting upon this washer is the lower end of a gauge tube 43, preferably of glass, as is customary, and concentric therewith and spaced therefrom is an indicating tube 44, made preferably of plastic material, upon which are the graduated scales 24 and 51. These tubes 43 and 44 are held in position by a cap 45 having a stem 47 fixed thereto at 48, with a threaded portion 49, which projects through the tubes 43 and 44, and is threaded into the aperture 50 in the bushing 28. Between the cap 45 and tube 43 is a washer 46. The gauge tube 43 is slightly longer than the graduated tube 44, so that when the cap 45 is in position, the tube 43 is held rigidly, but the tube 44 is sufficiently free to be manually rotated slightly so as to expose the graduated scales 24 and 51 thereon to any desired position. Within the tube 43 is an indicator disk 22, which is shown herein as washer shape, through the opening of which passes the stem 47. The perimeter of this indicator disk 22 is visible through the walls of both of the tubes 43 and 44 at all points about the axis thereof. It is threaded on a connection rod 21 which passes through an opening in the bushing 28 and is joined to the float rod holder 29 in a bushing 34, which provides a relatively long bearing. To prevent disengagement of this connection 21, the outer end thereof is flattened at 33, substantially as shown in Figure 3. The mechanism as a unit is associated with the tank, with the bushing 28 threaded in one wall thereof and the float 18 resting on the top of the fluid 16. When the tank is entirely empty the indicator disk 22 will be in register with the word "Empty" on the graduated scales, at which time the float 18 is resting upon the bottom of the tank. When the tank is filled the float will be in the position substantially as shown in broken lines in Figure 2, at which time the indicating disk 22 is in register with the word "Full" upon the graduated scales.

The moving of the float rod holder 29 upon its pivot mounting actuates the connection rod 21 and moves the indicating disk axially within the tube 43. The volume of fluid in the tank between "full" and "empty" is likewise indicated by movement and registry of the indicator disk 22 with the graduations on the scales 24 and 51, one such scale indicating a proportional volume of liquid and the other the gallonage.

It is apparent that some changes from the specific construction herein disclosed may be made, and therefore, I do not wish to be understood as limiting myself to the precise form of construction shown and described, but desire the liberty to make such changes in working my invention as may fairly come within the spirit and scope of the appended claims.

What I claim is:

1. In a tank gauge; a bushing; two concentric transparent cylindrical members associated therewith, one member having a scale thereon and shorter than and outside of the other member; and means for connecting said members to said bushing, with one member rigid and the shorter member rotatable in relation thereto, and whereby the scale thereon may be positioned at any convenient reading position concentric with the axis of said member.

2. In a tank gauge; a bushing; two concentric transparent cylindrical members associated therewith and spaced from each other, one being shorter than the other and positioned outside of the longer member, the shorter member having one or more graduated scales thereon; means, as a cap, adjustable relatively to the other member, for connecting said members to said bushing, whereby one member is rigid and the other rotatable about their common axis; an indicator in the inner of said members and visible through the walls thereof at all points about the axes thereof; and a float within the tank having connection with the indicator, and whereby the position thereof is variable with the level of the fluid within the tank.

3. A float holder having a substantially flat main portion provided with at least two apertures; a portion folded back to be substantially parallel with and overlying the main portion and formed with converging side walls, in combination with a rod projecting through both said apertures and clamped between the said main and parallel portions and under the converging walls of the latter.

4. In a tank gauge; a bushing; two concentric cylindrical transparent members associated therewith, one member having a scale thereon and shorter than and outside of the other member; a cap, covering the juxtaposed open ends of said members, having engagement with the end of the longer of said members and extending a limited distance along the side wall of the shorter of said members; and a threaded member connected with the cap and projected along the axis of said members, to be adjustably connected with the bushing, whereby one member is rigid and the other rotatable in relation thereto.

5. In a tank gauge; a bushing; two concentric cylindrical transparent members associated therewith, one member having a scale thereon and shorter than and outside of the other member; a cap covering the juxtaposed open ends of said members, having engagement with the end of the longer of said members and extending a limited distance along the side wall of the shorter of said members; a threaded member connected with the cap and projected along the axis of said members, to be adjustably connected with the bushing, whereby the inner member is rigid and the outer member rotatable in relation thereto; and an indicator in the inner of said members that surrounds the threaded member and is visible through the walls of the members at all positions about the axis thereof.

6. A float holder having a substantially flat main portion provided with at least two apertures; a portion folded back to be substantially parallel with and overlying the main portion and formed with converging side walls, in combination with a rod projecting through both said apertures and clamped between the said main and parallel portions and under the converging walls of the latter, one of said apertures being at the junction of the main and parallel portions and another in the main portion.

7. A float holder having a substantially flat main portion provided with at least two apertures, a portion folded back to be substantially parallel with and overlying the main portion and formed with converging side walls, in combination with a rod projecting through both said apertures and clamped between the said main and parallel portions and under the converging walls of the latter, the rod having a turned end that is anchored in the main portion aperture.

8. A float holder constructed of sheet metal, and having at least two apertures therethrough and folded upon itself to form two substantially parallel portions, the folded portion having converging side walls, in combination with a rod to be clamped between the parallel portions and having a turned end, which rod is passed through one aperture and the turned end projected into the other aperture before the holder is folded.

JOHN M. MELE.